(12) United States Patent
Hughes et al.

(10) Patent No.: US 8,067,193 B2
(45) Date of Patent: *Nov. 29, 2011

(54) PRODUCTION OF A FERMENTATION PRODUCT

(75) Inventors: Jonathan Hughes, Huddersfield (GB); Rajesh Mistry, Bradford (GB); Kenneth Charles Symes, Keighley (GB)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/587,583

(22) PCT Filed: Jan. 20, 2005

(86) PCT No.: PCT/EP2005/000520
§ 371 (c)(1),
(2), (4) Date: Jul. 28, 2006

(87) PCT Pub. No.: WO2005/075687
PCT Pub. Date: Aug. 18, 2005

(65) Prior Publication Data
US 2007/0172913 A1    Jul. 26, 2007

(30) Foreign Application Priority Data
Feb. 4, 2004    (GB) .................................. 0402469.1

(51) Int. Cl.
*C12P 1/00*    (2006.01)

(52) U.S. Cl. .......... 435/41; 435/106; 435/143; 435/144; 435/145; 435/150; 435/161; 426/11

(58) Field of Classification Search .................. None
See application file for complete search history.

(56) References Cited

U.S. PATENT DOCUMENTS

| | | | |
|---|---|---|---|
| 4,384,897 A | 5/1983 | Brink | 127/37 |
| 4,388,150 A | 6/1983 | Sunden et al. | 162/175 |
| 4,506,062 A | 3/1985 | Flesher et al. | 526/211 |
| 4,528,321 A | 7/1985 | Allen et al. | 524/761 |
| 4,599,379 A | 7/1986 | Flesher et al. | 524/801 |
| 4,650,689 A | 3/1987 | Hedrick | 426/600 |
| 4,720,346 A | 1/1988 | Flesher et al. | 210/734 |
| 4,728,613 A | 3/1988 | Brewer et al. | 435/222 |
| 4,753,710 A | 6/1988 | Langley et al. | 162/164.3 |
| 4,952,503 A | 8/1990 | Granstedt | 435/161 |
| 4,961,825 A | 10/1990 | Andersson et al. | 162/175 |
| 4,973,842 A | 11/1990 | Gruen et al. | 250/309 |
| 5,068,418 A | 11/1991 | Kulprathipanja et al. | 562/580 |
| 5,176,891 A | 1/1993 | Rushmere | 423/328.1 |
| 5,482,693 A | 1/1996 | Rushmere et al. | 423/328.1 |
| 5,536,325 A | 7/1996 | Brink | |
| 5,552,316 A | 9/1996 | Savage | 435/261 |
| 5,827,398 A | 10/1998 | Depasquale et al. | 162/164.1 |
| 5,975,439 A | 11/1999 | Chieffalo et al. | 241/17 |
| 6,132,625 A * | 10/2000 | Moffett | 210/727 |
| 6,217,778 B1 | 4/2001 | Shing et al. | 210/708 |
| 6,372,805 B1 | 4/2002 | Keiser et al. | 516/79 |
| 6,395,134 B1 | 5/2002 | Chen et al. | 162/168.1 |
| 6,927,048 B2 * | 8/2005 | Verser et al. | 435/161 |
| 7,566,469 B2 * | 7/2009 | Scheimann | 426/424 |
| 2003/0155091 A1 * | 8/2003 | Coffey et al. | 162/164.1 |
| 2005/0233031 A1 * | 10/2005 | Hughes | 426/52 |
| 2006/0057264 A1 | 3/2006 | Hughes et al. | 426/495 |

FOREIGN PATENT DOCUMENTS

| | | |
|---|---|---|
| CN | 1065442 | 10/1992 |
| CN | 1208446 | 2/1999 |
| CN | 1387597 | 12/2002 |
| EP | 0 335 575 | 10/1989 |
| JP | 53/058002 | 11/1976 |
| WO | 2004/015121 | 2/2004 |
| WO | 2004/015145 | 2/2004 |
| WO | 2004/051521 | 2/2004 |

OTHER PUBLICATIONS

Sun & Cheng, Bioresource Technology, 2002, vol. 83, p. 1-11.*
Ovenden et al., Colloids and surfaces A: Physicochemical and Engineering Aspects, 2002, vol. 197, p. 225-2340.*
Song et al., J Appl Polym Sci, 2003 vol. 87, p. 1101-1108.*
Wall et al., Journal of Agricultural & Food Chemistry, Jul.-Aug. 1983, p. 770-775.*
A. Wilkie et al.; Biomass & Bioenergy, vol. 19 (2000) pp. 63-102.
National Renewable Energy Laboratory Report, Jul. 1999, NREL/TP-580-26157.
National Renewable Energy Laboratory Report, Mar. 2001, 99-10600/14.
Derwent Abstract No. 1978-48300A[27] of JP 53058002(6/04).
English Language abstract of CN 1065442 from the esp@cenet web site, 1992.

* cited by examiner

Primary Examiner — Kade Ariani
(74) Attorney, Agent, or Firm — Shruti Costales

(57) ABSTRACT

A process of separating suspended solids from a fermentation liquor by subjecting the liquor to a solids-liquid separation stage, wherein the fermentation liquor is produced in a fermentation process for the production of a fermentation product, in which the liquor has been subjected to a temperature of at least 50° C., wherein the solids-liquid separation stage is assisted by a treatment system, characterised in that the treatment system comprises an anionic polymer selected from natural polymers and modified natural polymers having a high anionic charge such that the equivalent weight is below 300, and synthetic polymers formed from at least 50% by weight anionic monomer units.

21 Claims, No Drawings

PRODUCTION OF A FERMENTATION PRODUCT

The present invention relates to processes of treating a substrate, and in particular plant derived material, to provide an aqueous liquor containing sugars which are used in a fermentation process to produce a fermentation product. In particular the present invention relates to a process of dewatering a fermentation broth residue, produced following a heat treatment step or most preferably as a by-product from the distillation step following a fermentation process wherein the volatile distillation product is recovered. Typically the dewatered solids are dried and used as a solid fuel. The clarified water would normally be returned to watercourses and/or used as wash liquor further back in the process.

Typically such fermentation products include for instance ethanol, glycerol, acetone, n-butanol, butanediol, isopropanol, butyric acid, methane, citric acid, fumaric acid, lactic acid, propionic acid, succinic acid, itaconic acid, acetic acid, acetaldehyde, 3-hydroxypropionic acid, glycolic acid, tartaric acid and amino acids (such as L-glutamic acid, L-lysine, L-aspartic acid, L-tryptophan, L-arylglycines) or salts of any of these acids.

It is known to treat a biomass with acid in order to hydrolyse polysaccharides to the component sugars that can be used in a fermentation process to produce a fermentation product. For instance U.S. Pat. No. 4,384,897 describes a method of treating biomass material in which it is subjected to a two stage hydrolysis in which polysaccharides that are more easily hydrolysed, such as hemicellulose and then in a second stage the material that is more difficult to depolymerise e.g. cellulose, is depolymerised using a more severe hydrolytic treatment. The products of the first and second stages include sugar solutions, organic acids, and aldehydes. The monosaccharides are subjected to fermentation to produce ethanol and the beer resulting from the fermentation may then be subjected to rectification to produce ethanol of commercial grade. U.S. Pat. No. 4,384,897 sets out to provide improvements in more efficient washing of solids, the use of co-current washing or counter-current washing of solids and proposes the use of ferric and/or aluminium ions as flocculating agents to separate finely dispersed solids resulting from the neutralisation of the hydrolysate liquor stream.

U.S. Pat. No. 4,728,613 describes the use of a glycol derivative and an inorganic salt to recover extracellular enzymes from whole fermentation beer. High concentrations of the glycol derivative (1-15 weight percent) and inorganic salt (8-35 weight percent) are used to form a 2-phase system to recover the enzyme.

U.S. Pat. No. 5,552,316 concerns the combination of anionic and cationic flocculants that are used to clarify an aqueous solution containing microbial cells (*Escherichia coli*). The *E. coli* is generated in a fermentation process.

It is also known from a National Renewable Energy Laboratory (NREL) report entitled "Lignocellulose Biomass to Ethanol Process Design and Economics of Co-Current Dilute Acid Prehydrolysis and Enzymatic Hydrolysis Current and Future Scenarios", NREL/IP-580-26157 (July 1999) to treat cellulose as the second polysaccharide by a cellulase enzyme in order to hydrolyse the cellulose into its component sugars. In one form of this process the solid by-product residue resulting from the first hydrolysis step and containing cellulose is divided into a main stream and a secondary stream. The main stream is fed directly into the fermentation vessel and the secondary stream is passed to a cellulase production stage, in which fungi are allowed to grow and act upon the cellulose, such that sugars and cellulase are formed. The sugars and cellulase are then fed into the fermentation vessel and the cellulase acts upon the cellulose from the main stream and converts it into the component sugars that in turn can be fermented to produce the fermentation product.

It is known to treat shredded cellulosic material using concentrated acid to provide aqueous solutions of sugars, which can be used in a fermentation process. For instance U.S. Pat. No. 4,650,689 discloses a process of preparing ethanol from cellulosic material by subjecting the cellulosic material to highly concentrated mineral acid gas such as HCl under pressure, and treatment with hot water to give a liquor containing sugars which can be fermented.

U.S. Pat. No. 5,975,439 describes an automated process for producing ethanol by shredding the cellulosic component of municipal solid waste and mixing this with equal amounts of concentrated sulphuric acid at high temperature to provide a digested mixture. The aqueous sugar solution is separated from the solids by a filtration process before being subjected to a fermentation process.

However, in the recovery of the fermentation product from the fermentation broth it is sometimes necessary to distil off the fermentation product continually in a distillation stage, wherein a stillage stream, comprising residues and by-products is also removed.

WO-A-8603514 describes manufacture of ethanol by fermentation and then extraction of the ethanol from the fermentation broth. The residual fermentation broth liquor contains yeast and dissolved polymeric materials such as polysaccharides and proteins. An advantage of locating the solid liquid separation stage after the distillation stage is that some part of the non-separable dissolved protein in the fermentation liquor is transferred into a separable form through coagulation due to heating in the distillation and heat exchange processes.

In a study by Ann C Wilkie et al., (Biomass and Bioenergy 19 (2000) 63-102), the treatment of ethanol stillage is evaluated. The bacterium, *Zymomonas mobilis* has been shown to produce higher ethanol yields but there is difficulty in separating the stillage liquor from the solid material. The study also identifies the difficulty in separating suspended solids from sugar crops and cellulosic crops.

In general, the stillage stream or still bottoms resulting from the distillation processes is subjected to a solids-liquid separation step to produce a dewatered product which can be dried to produce a dry solid fuel product. The aqueous liquid separated from the solids are either returned to watercourses and/or recycled as wash water used in the washing of acid treated plant derived material. The stillage stream or still bottoms are normally high in biological oxygen demand (BOD) and so it is important to ensure that the aqueous liquid is effectively clarified and the water produced therefrom is substantially free of impurities in order not to poison watercourses and/or when used as wash liquor contaminate the substrate that is being washed.

The stillage stream contains precipitated protein based impurities and high levels of lignin, which make it difficult to flocculate and effect solids liquid separation. It is known from an NREL report entitled "Liquid/Solid Separation" 99-10600/14 (March 2001) to treat post distillate slurry with a single polymer solution of concentration 0.01 to 0.02 wt %, identified as Perc-765, at doses in the range of 0.4 to 1 kg/tonne of dry solids to effect the dewatering of the solids on a belt press to a final solids content of 26-29 wt %. However, the filtrate clarity is poor. When separating a dilute feed of 3 to 4 wt % insolubles a filtrate containing solids of 0.25 wt % or greater is produced. It is noted that when operating with a desired feed concentration of 11.7 wt % the ability to flocculate the solids may be even worse and it will be necessary to either dilute the feed stream, use greater mixing intensity, and/or increase the polymer dose. Based on the final solids content and the filtrate solids achieved in these studies, belt presses were not recommended for this application. Normally such liquors have been subjected to elevated temperatures, for instance above 50° C. and can be as high as 95° C. or 100° C. and for process time and energy efficiency reasons may require solid/liquid separation at elevated temperatures, typically above 50° C. which adds further to the difficulty of optimisation of the separation stage.

International application PCT/EP 03/08427 (unpublished at the priority date of the present application) addressed the difficulty in flocculating adequately such liquors that have been subjected to these elevated temperatures. Improvements in solid/liquid separation of a fermentation product which contains lignocellulosic residues (or lignin) were achieved using a treatment system comprising a cationic polymer having an intrinsic viscosity of at least 4 dl/g. The process involves using a dose of cationic polymer above 2 kg/tonne based on dry weight of suspension, or in using the cationic polymer and a co—additive selected from anionic polymer, a cationic polymer of intrinsic viscosity below 4 dl/g and a cationic charge density of at least 3 meq/g and/or inorganic coagulants and/or charged microparticulate material.

The term "fermentation liquor" is used here to include mixtures often referred to as "mixed fermentation liquor", or "fermentation broth". These liquors include those resulting from agricultural plant derived materials that have been subjected to one or more fermentation stages.

We provide a process of separating suspended solids from such fermentation liquors after their exposure to a heating step or steps by subjecting the resulting mixture to a solid/liquid separation stage, wherein the fermentation liquor is produced in a fermentation process for the production of a fermentation product and in which the fermentation liquor has been subjected to a temperature of at least 50° C., wherein the solid/liquid separation stage is assisted by a treatment system, characterised in that the treatment system comprises an anionic polymer selected from natural or modified natural polymers having a high anionic charge such that the equivalent weight is below about 300 (generally this would be higher than 3.3 meq/g) and/or synthetic polymers formed from at least 50% by weight anionic monomer units (generally this would be greater than 5.3 meq/g).

We have found unexpectedly that the yield and/or efficiency of the process can be improved by effecting a rapid but efficient solids-liquid separation of the solid residues from a fermentation liquor that has been subjected to elevated temperatures. Such heat treatment may result in exposure to temperatures significantly higher than 50° C., for instance 60 or 70° C. and especially in the range of 80 to 100° C. The process is particularly suitable for separation processes in which the fermentation liquor has been recovered after the fermentation product has been substantially removed by a distillation step. The process enables the recovery of soluble components from the distillation column still bottom liquors (stillage) because they are rendered insoluble as a result of the heat treatment, or exposure to a distillation process for the production of a fermentation product, for instance ethanol.

Generally the fermentation liquor (containing biomass) will tend to be at a pH below neutral and often below 6. The pH can be as low as 3 but it usually would be at least 4 or 5.

The process is particularly suited to the dewatering of heat treated fermentation liquor and separation of solids therefrom. Typically the biomass may be derived from materials containing hemicelluloses and lignocellulosic compounds and in which case the fermentation liquor may contain lignin and lignin-type substances. Alternatively it may be derived from a purer carbohydrate substrate such as sugars derived from crops producing starch, for example wheat, corn, potatoes, rice and the like or sucrose from sugar cane or sugar beet, in which case the fermentation liquor could be largely devoid of lignin. Such a process could include the distillation of the fermentation liquor to produce ethanol for fuel as a fermentation product and especially where in the fermentation liquor contains lignin. Where the fermentation liquor is devoid of lignin the fermentation product may be potable ethanol.

The process is particularly suitable for fermentation liquors containing lignin and which are high in BOD caused by the presence of soluble organic compounds and in which the recovered clarified aqueous stream can be recycled into an earlier stage of the process. The treatment system of the present invention enables a significantly improved separation of liquid from the solid residues and by-products. In particular the process induces more effective flocculation and the separation process is found to be significantly faster. In addition where the fermentation liquor contains lignin the solid residues (mainly lignin) resulting from the separation process of the heated fermentation liquor have higher cake solids than those recovered from use of conventional separation treatments. Such a solid product would take less time and energy to dry and thus can be for instance used more efficiently as a solid fuel. Where the fermentation liquor is substantially devoid of lignin, more effective separation of the solids can also be achieved in comparison with a conventional separation. In this case the recovered solids could be suitable as either a solid fuel or as an animal feed.

We have found that the treatment system is particularly effective when using polymers that have a high anionic charge. The natural or modified natural (semi-natural) polymer will preferably have a low equivalent weight below about 300 and can be as low as 150 or lower. The equivalent weight is the molecular weight per anionic charge and generally can be readily determined by colloid titration. Preferably the synthetic anionic polymer used in the treatment system will comprise above 50% by weight anionic monomer units, suitably between 65 and 100% by weight. In some cases it may be particularly desirable to use polymers that comprise at least 70 or at least 80% by weight anionic monomer.

The anionic polymer may be a synthetic, modified natural (semi-natural) or natural polymer. Examples of suitable natural polymers include sulphated polysaccharides such as carrageenan or those containing uronic acids such as alginates and pectins.

Synthetic anionic polymers may be derived from ethylenically unsaturated monomer or monomer blend comprising at least one anionic monomer. Typically the anionic monomer can be any suitable water-soluble ethylenically unsaturated monomer and containing a pendant acid group existing either as the free acid or a salt thereof. The anionic polymer may be formed from anionic monomers selected from the group consisting of (meth) acrylic acid (or salts), maleic acid (or salts), itaconic acid (or salts), fumaric acid (or salts), vinyl sulfonic acid (or salts), allyl sulfonic acid and 2-acrylamido-2-methyl sulfonic acid (or salts). Suitable salts of the anionic monomers include alkali metal and ammonium salts. The polymers may be formed by the polymerisation of at least one anionic monomer optionally in the presence of other suitable monomers, which could for instance be water-soluble non-ionic monomers such as acrylamide. By water-soluble we mean that the monomer has a solubility of at least 5 g/100 ml at 25° C. A particularly suitable polymer and its copolymer is sodium acrylate with acrylamide.

The polymers may be linear in that they have been prepared substantially in the absence of branching or cross-linking agent. Alternatively the polymers can be branched or cross-linked, for example as in EP-A-202780. In the invention, the anionic polymer may be formed by any suitable polymerisation process. The polymers may be prepared for instance as gel polymers by solution polymerisation, water-in-oil suspension polymerisation or by water-in-oil emulsion polymerisation. When preparing gel polymers by solution polymerisation the initiators are generally introduced into the monomer solution to initiate polymerisation. Once the polymerisation is complete and the polymer gel has been allowed to cool sufficiently the gel can be processed in a standard way by first comminuting the gel into smaller pieces, drying to the substantially dehydrated polymer followed by grinding to a powder. The polymers may be produced as beads by suspension polymerisation or as a water-in-oil emulsion or dispersion by water-in-oil emulsion polymerisation, for example according to a process defined by EP-A-150933, EP-A-102760 or EP-A126528.

The anionic polymer is typically a high molecular weight polymer having a molecular weight above 500,000 and usually of several million, for instance 5 to 30 million. Preferably the anionic polymer exhibits an intrinsic viscosity of at least 4 dl/g. An aqueous polymer solution (0.5-1% w/w) is prepared based on the active content of the polymer. 2 g of this 0.5-1% polymer solution is diluted to 100 ml in a volumetric flask with 50 ml of 2M sodium chloride solution that is buffered to pH 7.0 (using 1.56 g sodium dihydrogen phosphate and 32.26 g disodium hydrogen phosphate per litre of deionised water) and the whole is diluted to the 100 ml mark with deionised water. The intrinsic viscosity is measured using a Number 1 suspended level viscometer at 25° C. using the buffered salt solution as a 'blank' reading.

Particularly preferred polymers exhibit an intrinsic viscosity from 6 or 7 dl/g and can be as high as 20 or 30 dl/g or higher. Typically they can be in the range of 11 or 12 up to 17 or 18 dl/g.

The dose of anionic polymer is typically at least 50 grams per tonne (based on dry weight of fermentation liquor). The dose is usually significantly higher, and can be typically up to 5000 grams per tonne. Usually the amount of polymer is added in an amount between 500 and 3000 grams per tonne, especially around 750 to 2000 grams per tonne.

The treatment system desirably may employ the anionic polymer or polymers as the treatment agent. On the other hand for some systems it may be appropriate to use additional flocculating agents or coagulants. Typically this may be by introducing a further polymeric flocculating agent or coagulant. We have found that the separation process is particularly effective when the treatment system comprises a cationic coagulant as a second component in addition to the anionic polymer. In particular a preferred embodiment employs a treatment system that comprises (i) an anionic polymer as described above and (ii) a cationic polymer of intrinsic viscosity of below 4 dl/g.

In a treatment system comprising anionic polymer and cationic polymer of intrinsic viscosity below 4 dl/g, these may be added simultaneously, either as a pre-mix or alternatively separately. In one preferred form of the invention an anionic polymer is added first followed by the addition of low IV cationic polymer. The reverse order of addition is also possible and may be particularly suited to certain cases.

The cationic polymer may be a low IV natural, modified natural or synthetic cationic polymer which exhibit intrinsic viscosity of below 4 dl/g and a cationic charge density of at least 3 meq/g.

Preferably the low IV polymer is selected from the group consisting of polyamines, amine/epihalohydrin addition polymers, polymers of dicyandiamide with formaldehyde, polymers of diallyldimethyl ammonium chloride (DADMAC), cationic starch, cationic inulin, polymers of dialkyl amino alkyl(meth) acrylates (or salts) and dialkyl amino alkyl (meth) acrylamides (or salts). Polyamines may be commercially available polyamines, for instance polyethyleneimine (PEI). Cationic starch or cationic inulin may be commercially available products.

Preferred cationic polymers are addition polymers of formaldehyde with dimethylamine and optionally other amines such as ethylenediamine, or polymers of formaldehyde with dicyandiamide. More preferred low IV polymeric coagulants include polymers of water soluble ethylenically unsaturated cationic monomer or blend of monomers of at least one cationic, non-ionic and/or anionic monomer(s) alone or with other water soluble monomers, provided that the polymer has a cationicity of at least 3 meq/g. By water-soluble we mean that the monomer has a solubility of at least 5 g/100 ml at 25° C. Particularly preferred polymers are homopolymers of diallyldimethyl ammonium chloride or copolymers of diallyldimethylammonium chloride with up to 20 mole % acrylamide. Typically such polymers would have molecular weights of up to 2,000,000 and usually below 1,000,000, for instance 200,000 up to 600,000. Useful polymers would ideally exhibit an intrinsic viscosity of below 4 dl/g.

The cationic polymer is suitably introduced into the aqueous suspension in any suitable amount in order to effect flocculation or coagulation of the suspended solids. Usually the dose of polymer is at least 50 grams per tonne (based on dry weight of fermentation liquor). The dose is usually significantly higher, and can be typically up to 5000 grams per tonne. Usually the amount of polymer is added in an amount between 500 and 3000 grams per tonne, especially around 750 to 2000 grams per tonne.

The treatment system desirably may employ the anionic polymer in conjunction with other flocculent or coagulant additives. A particularly suitable additive to be used as part of the treatment system with the anionic polymer is a siliceous material. The siliceous material may be added simultaneously with the anionic polymer but usually would be added sequentially, especially subsequently to the use of the anionic polymer. The siliceous material may be any of the materials selected from the group consisting of silica based particles, silica microgels, colloidal silica, silica sols, silica gels, polysilicates, aluminosilicates, polyaluminosilicates, borosilicates, polyborosilicates, zeolites or swellable clay.

This siliceous material may be in the form of an anionic microparticulate material. Alternatively the siliceous material may be a cationic silica. Desirably the siliceous material may be selected from silicas and polysilicates. The silica may be for example any colloidal silica, for instance as described in WO-A-8600100. The polysilicate may be a colloidal silicic acid as described in U.S. Pat. No. 4,388,150.

The polysilicates may be prepared by acidifying an aqueous solution of an alkali metal silicate. For instance polysilicic microgels otherwise known as active silica may be prepared by partial acidification of alkali metal silicate to about pH 8-9 by use of mineral acids or acid exchange resins, acid salts and acid gases. It may be desired to age the freshly formed polysilicic acid in order to allow sufficient three dimensional network structure to form. Generally the time of ageing is insufficient for the polysilicic acid to gel. Particularly preferred siliceous material include polyaluminosilicates. The polyaluminosilicates may be for instance aluminated polysilicic acid, made by first forming polysilicic acid microparticles and then post treating with aluminium salts, for instance as described in U.S. Pat. No. 5,176,891. Such polyaluminosilicates consist of silicic microparticles with the aluminium located preferentially at the surface.

Alternatively the polyaluminosilicates may be polyparticulate polysicilic microgels of surface area in excess of 1000 m$^2$/g formed by reacting an alkali metal silicate with acid and water soluble aluminium salts, for instance as described in U.S. Pat. No. 5,482,693. Typically the polyaluminosilicates may have a mole ratio of alumina:silica of between 1:10 and 1:1500.

The siliceous material may be a colloidal borosilicate, for instance as described in WO-A-9916708. The colloidal borosilicate may be prepared by contacting a dilute aqueous solution of an alkali metal silicate with a cation exchange resin to produce a silicic acid and then forming a heel by mixing together a dilute aqueous solution of an alkali metal borate with an alkali metal hydroxide to form an aqueous solution containing 0.01 to 30% $B_2O_3$, having a pH of from 7 to 10.5.

When the siliceous material is a swellable clay it may for instance be typically a bentonite type clay. The preferred clays are swellable in water and include clays which are naturally water swellable or clays which can be modified, for instance by ion exchange to render them water swellable. Suitable water swellable clays include but are not limited to clays often referred to as hectorite, smectites, montmorillonites, nontronites, saponite, sauconite, hormites, attapulgites and sepiolites. Typical anionic swelling clays are described in EP-A-235893 and EP-A-335575.

The dose of siliceous material would be typically at least 50 grams per tonne (based on dry weight of fermentation liquor). The dose would be usually significantly higher, and can be as much as up to 10,000 grams per tonne or higher. Usually the amount of polymer is added in an amount between 100 and 3000 grams per tonne, especially around 500 to 2000 grams per tonne. In order to ensure that the coagulated or flocculated solids are separated from the liquid medium, the fermentation liquor solid residue is subjected to a mechanical dewatering stage during or subsequent to application of the treatment system. The mechanical dewatering step is ideally selected from at least one of, a centrifuge, a screw press, a filter press, a belt filter press, a horizontal belt filter or preferably a pressure filter.

The aqueous liquid separated from the fermentation liquor solid residue comprises sugars and/or other soluble components that contribute to BOD and are generally free of unwanted suspended solids and desirably are recycled into a fermentation process in order to produce a fermentation product.

The fermentation liquor solid residue often comprises lignin and lignin-type substances and these are generally difficult to dewater. Generally the separated fermentation liquor solid residue is subjected to a drying stage and the dried residue may for instance be used as a solid fuel, a nutrient source for further fermentation, an animal feed or a source of chemicals. The process enables the manufacture of the fermentation product to be made more efficient. Preferably the fermentation product is selected from the group consisting of ethanol, glycerol, acetone, n-butanol, butanediol, isopropanol, butyric acid, methane, citric acid, fumaric acid, lactic acid, propionic acid, succinic acid, itaconic acid, acetic acid, acetaldehyde, 3-hydroxypropionic acid, glycolic acid, tartaric acid and amino acids such as L-glutamic acid, L-lysine, L-aspartic acid, L-tryptophan, L-arylglycines or salts of any of these acids.

The following examples illustrate the invention.

Example 1

Various anionic polymers are tested on a post-distillation heat treated fermentation liquor to establish filterability or dewatering efficiency. Each anionic polymer is tested by measuring the capillary suction time (CST). CST is based on the suction pressure created by capillaries within absorbent paper. A standard-sized circular area in the centre of a piece of absorbent paper is exposed to the sample, whilst the remaining area of paper is used to absorb the filtrate drawn out by the capillary suction of the paper. The rate at which filtrate spreads outward from the sample, saturating progressively an increasing area of paper, is controlled predominantly by the filterability of the sample. The CST apparatus automatically measures the time for the interface between the wet and dry portions of the paper to travel a given distance.

The reading obtained is the CST measured in seconds. The lower the CST the better the filterability. A 10 mm diameter sample cell is used. The fermentation liquor sample (7% dry solids) from a potable ethanol distillery stills bottom is heated to 70° C. Polymer is added to the sample. The sample is inverted 8 times and the hot mixture poured into the CST apparatus. The rate at which free water is drawn outwards from the sample is determined. The faster the rate of dewatering, the lower the CST obtained. The results are shown in Table 1 for the CSTs obtained in comparison with (a) Target CST: from the centrate of a centrifuged sample of the fermentation liquor and (b) Control: water addition alone to the sample rather than polymer. Polymer doses quoted are based on the amount added to the fermentation liquor having a solids content of 7%

TABLE 1

| Flocculant | Anionic Content (weight %)[1] | Intrinsic Viscosity (dl/g) | CST (seconds) | Polymer Dose (ppm) |
|---|---|---|---|---|
| Target (centrate) | | | 12 | |
| Control (water) | | | 200 | |
| Polymer 1 | 47 | 24 | 84 | 60 |
| Polymer 2 | 52. | 11 | 61 | 120 |
| Polymer 3 | 55 | 13 | 82 | 120 |
| Polymer 4 | 70 | 9 | 38 | 240 |
| Polymer 5 | 100 | 13 | 62 | 240 |
| Polymer 6 | 100 | 13 | 95 | 240 |

Example 2

The test in Example 1 is repeated with a second sample of fermentation liquor from a potable ethanol distillery stills bottom. The results are shown in Table 2. The polymer doses given are based on fermentation liquor with a solids content of 7%

TABLE 2

| Flocculant | Anionic Content (weight %)[2] | Intrinsic Viscosity (dl/g) | CST (seconds) | Polymer Dose (ppm) |
|---|---|---|---|---|
| Target (centrate) | | | 19 | |
| Control (water) | | | 388 | |
| Polymer 1 | 67 | 9 | 60 | 180 |
| Polymer 2 | 69 | 27 | 57 | 120 |
| Polymer 3 | 76 | 24 | 63 | 120 |
| Polymer 4 | 76 | 19 | 56 | 120 |

TABLE 2-continued

| Flocculant | Anionic Content (weight %)[2] | Intrinsic Viscosity (dl/g) | CST (seconds) | Polymer Dose (ppm) |
|---|---|---|---|---|
| Polymer 5 | 86 | 27 | 85 | 180 |
| Polymer 6 | 89 | 20 | 147 | 240 |
| Polymer 7 | 95 | 15 | 73 | 240 |
| Polymer 8 | 95 | 20 | 116 | 240 |

[1]polymers 1, 2, 4, are sodium acrylate:acrylamide co-polymers; polymer 3 is poly2-acrylamido-2-methylsulphonate:acrylamide; polymers 5 and 8 are polysodium acrylate
[2]polymers are all sodium acrylate:acrylamide copolymers Example 3

The test described in example 1 was used with a sample of fermentation liquor from a still bottom from a fuel ethanol process which contains lignin (8% dry solids content). The sample testing is carried out at room temperature. The results are shown in Table 3. The polymer doses are based on fermentation liquor containing 8% dry solids.

TABLE 3

| Flocculant | Anionic Content (weight %)[3] | Intrinsic Viscosity (dl/g) | CST (seconds) | Polymer Dose (ppm) |
|---|---|---|---|---|
| Target (centrate) | | | 35 | |
| Control (Water) | | | 126 | |
| Polymer 1 | 20 | 18 | 283 | 30 |
| Polymer 2 | 30 | 18 | 279 | 30 |
| Polymer 3 | 40 | 18 | 215 | 30 |
| Polymer 4 | 40 | 18 | 155 | 30 |
| Polymer 5 | 50 | 16 | 154 | 15 |
| Polymer 6 | 52 | 11 | 69 | 30 |
| Polymer 7 | 55 | 16 | 48 | 30 |
| Polymer 8 | 70 | 9 | 33 | 120 |
| Polymer 9 | 100 | 13 | 77 | 240 |
| Polymer 10 | 100 | 13 | 82 | 120 |
| Polymer 11 | 100 | 1 | 85 | 120 |
| Carrageenan | Not measured | Not measured | 55 | 180 |

[3]polymers are sodium acrylate:acrylamide copolymers except polymers 4, and 7 which are poly 2-acrylamido-2-methylsulphonate:acrylamide copolymers and 11 which is poly 2-acrylamido-2-methylsulphonate Example 4

The test described in example 1 was used with a sample of fermentation liquor from a still bottom from a fuel ethanol process which contains lignin (8% dry solids content). The sample testing is carried out at room temperature. The results are shown in Table 4. The polymer doses are based on fermentation liquor containing 8% dry solids. The anionic polymer was added to the fermentation liquor, followed immediately by the cationic polymer

TABLE 4

| | | CST (seconds) |
|---|---|---|
| Target (centrate) | | 35 |
| Control (water) | | 126 |
| Anionic Polymer | Cationic Polymer[4] | |
| Polymer 1 (52% anionic charge by weight) 60 ppm | Polymer 2 (59% cationic charge by weight wt %) 120 ppm | 36 |
| Carrageenan (180 ppm) | Chitosan (60 ppm) | 48 |

[4]anionic polymer is a sodium acrylate:acrylamide copolymer and cationic polymer is quaternary salt of dimethylaminoethylacrylate:acrylamide copolymer

The invention claimed is:

1. A process of separating suspended solids from a fermentation liquor comprising the following sequence of steps:
    (i) producing the fermentation liquor in a fermentation process for the production of a fermentation product;
    (ii) subjecting the fermentation liquor produced in step (i) to a temperature of at least 50° C. and recovering the fermentation product from said liquor; and
    (iii) subjecting the fermentation liquor obtained in step (ii) to a solids-liquid separation stage to separate the suspended solids and remove the suspended solids from the liquor,
    wherein the solids-liquid separation stage is assisted by a treatment system, and wherein the treatment system comprises an anionic polymer selected from natural polymers and modified natural polymers having an anionic charge such that the equivalent weight is below 300, and synthetic polymers, the anionic polymer is formed from at least 50% by weight anionic monomer units and said anionic monomer units are selected from the group consisting of (meth)acrylic acids or salts, maleic acid or salts, itaconic acid or salts and fumaric acid or salts.

2. A process according to claim 1 in which said fermentation liquor in step (ii) is subjected to a distillation stage in which the fermentation product is recovered, wherein the liquor is removed from the distillation stage as a stillage stream and then subjected to the solids-liquid separation stage.

3. A process according to claim 1 in which the treatment system comprises an anionic polymer formed from at least 65% by weight anionic monomer units.

4. A process according to claim 1 in which the anionic polymer exhibits an intrinsic viscosity of at least 4 dl/g (measured using a suspended level viscometer in 1M NaCl buffered to pH 7.5 at 25° C.).

5. A process according to claim 1 in which the treatment system further comprises addition of a cationic polymer that exhibits an intrinsic viscosity below 4 dl/g (measured using a number 1 suspended level viscometer in 1M NaCl buffered to pH 7.0 at 25° C.).

6. A process according to claim 5 in which the cationic polymer exhibits a charge density of at least 3 meq/g.

7. A process according to claim 5 in which the cationic polymer is selected from the group consisting of polyamines, amine/epihalohydrin addition polymers, polymers of dicyandiamide with formaldehyde, polymers of diallyldimethyl ammonium chloride (DADMAC), cationic starch and cationic inulin, polymers of dialkyl amino alkyl(meth)acrylates (or salts) and dialkyl amino alkyl(meth) acrylamides (or salts).

8. A process according to claim 5 in which the anionic polymer and cationic polymer are added sequentially.

9. A process according to claim 1 in which the dose of anionic polymer is at least 50 grams per tonne (based on dry weight of fermentation liquor).

10. A process according to claim 5 in which the dose of cationic polymer is at least 50 grams per tonne (based on dry weight of fermentation liquor).

11. A process according to claim 1 in which the treatment system further comprises addition of a siliceous material.

12. A process according to claim 11 in which the siliceous material is selected from the group consisting of silica based particles, silica microgels, colloidal silica, silica sols, silica gels, polysilicates, cationic silica, aluminosilicates, polyaluminosilicates, borosilicates, polyborosilicates, zeolites and swellable clays.

13. A process according to claim 11 in which the siliceous material is an anionic microparticulate material.

14. A process according to claim 11 in which the siliceous material is a bentonite type clay.

15. A process according to claim 11 in which the siliceous material is selected from the group consisting of hectorite, smectites, montmorillonites, nontronites, saponite, sauconite, hormites, attapulgites and sepiolites.

16. A process according to claim 1 in which the fermentation liquor is subjected to a mechanical dewatering stage during or subsequent to application of the treatment system.

17. A process according to claim 16 in which the mechanical dewatering step is selected from the group consisting of a centrifuge, a screw press, a filter press, a belt filter press, a horizontal belt filter, and a pressure filter.

18. A process according to claim 1 in which the treated liquor from which suspended solids have been removed are recycled and used as wash water.

19. A process according to claim 1 in which the fermentation liquor comprises lignin and in which the separated solids are dewatered and then subjected to a drying stage to provide a dry solid material and in which the dry solid material is used as a solid fuel.

20. A process according to claim 1 in which said fermentation liquor in step (ii) is derived from crop sugars and in which the separated solids are dewatered and then subjected to a drying stage to provide a dry solid material and in which the dry solid material is used as a solid fuel or as an animal feed.

21. A process according to claim 1 in which the fermentation product is selected from the group consisting of ethanol, glycerol, acetone, n-butanol, butanediol, isopropanol, butyric acid, methane, citric acid, fumaric acid, lactic acid, propionic acid, succinic acid, itaconic acid, acetic acid, acetaldehyde and 3-hydroxypropionic acid, glycolic acid, tartaric acid, and amino acids or salts of any of these acids.

* * * * *